US012619632B2

(12) United States Patent
Biewald

(10) Patent No.: US 12,619,632 B2
(45) Date of Patent: May 5, 2026

(54) PREPARATION OF A TRANSACTIONALLY CONSISTENT DATABASE CLONE DURING A DOWNTIME OPTIMIZED DATABASE CONVERSION

(71) Applicant: SAP SE, Walldorf (DE)

(72) Inventor: Lars-Eric Biewald, Mannheim (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 18/917,429

(22) Filed: Oct. 16, 2024

(65) Prior Publication Data

US 2026/0105067 A1     Apr. 16, 2026

(51) Int. Cl.
*G06F 16/00*        (2019.01)
*G06F 9/451*        (2018.01)
*G06F 16/27*        (2019.01)

(52) U.S. Cl.
CPC ............ *G06F 16/273* (2019.01); *G06F 9/451* (2018.02)

(58) Field of Classification Search
CPC ............................... G06F 16/273; G06F 16/27
See application file for complete search history.

(56) References Cited

U.S. PATENT DOCUMENTS

| | | | |
|---|---|---|---|
| 9,436,724 B2 | 9/2016 | Driesen et al. | |
| 10,013,315 B2 | 7/2018 | Biewald | |
| 2018/0246945 A1 * | 8/2018 | Lee ..................... | G06F 11/3476 |
| 2023/0385300 A1 * | 11/2023 | Ash ........................ | G06F 16/215 |

* cited by examiner

*Primary Examiner* — Cheryl Lewis
(74) *Attorney, Agent, or Firm* — Fish & Richardson P.C.

(57) ABSTRACT

A computer-implemented method includes starting on a source database (DB), a software update manager (SUM). DB triggers and log tables are created on the source DB and by the SUM. Creation of a clone DB is initiated, where the clone DB is a clone of the source DB. Using connection data to the clone DB, a connection to the clone DB is tested. Using the SUM and the connection data to the clone DB, initial data from the clone DB is transferred to a target DB. Using the SUM, a delta replay of recorded changes made to the source DB since creation of the clone DB is initiated.

20 Claims, 3 Drawing Sheets

Clone-based Software Update Manager (SUM) approach

Figure 2:
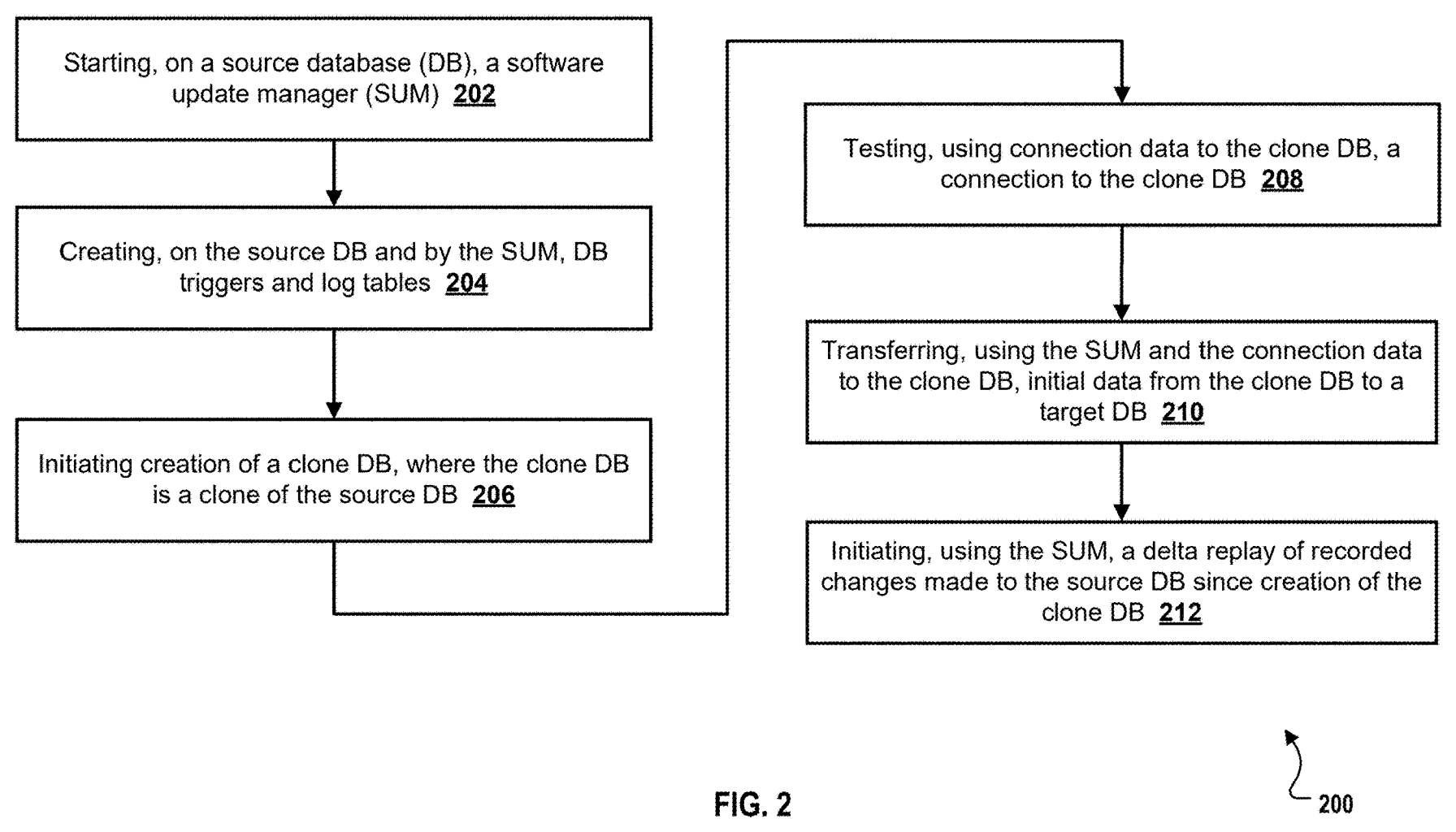

Starting, on a source database (DB), a software update manager (SUM) 202

Creating, on the source DB and by the SUM, DB triggers and log tables 204

Initiating creation of a clone DB, where the clone DB is a clone of the source DB 206

Testing, using connection data to the clone DB, a connection to the clone DB 208

Transferring, using the SUM and the connection data to the clone DB, initial data from the clone DB to a target DB 210

Initiating, using the SUM, a delta replay of recorded changes made to the source DB since creation of the clone DB 212

PREPARATION OF A TRANSACTIONALLY CONSISTENT DATABASE CLONE DURING A DOWNTIME OPTIMIZED DATABASE CONVERSION

BACKGROUND

A traditional software update manager (SUM) (e.g., SAP SOFTWARE UPDATE MANAGER) offers a procedure (e.g., SAP R3LOAD) for a downtime optimized database (DB) conversion (e.g., to an SAP S/4HANA in-memory DB). The procedure enables a time-consuming migration of the source DB data to be primarily migrated in uptime to reduce downtime of a database to convert and associated software applications. Transactional consistency is a crucial prerequisite to execute the uptime conversion. However, due to the need to copy a large amount of data in a table-wise manner, it is difficult to ensure that a header table is copied at the same point-in-time as a dependent item table. A current solution uses complex DB trigger technology to ensure transactional consistency, but the DB trigger-based solution adds additional load on a production system and an initial data transfer of data from a source database can increase memory and CPU utilization. Additional load on the production system and increased memory and CPU utilization can force continuous adjustment of a number of processes to copy DB data.

SUMMARY

The present disclosure describes preparation of a transactionally consistent database clone during a downtime optimized database conversion.

In an implementation, a computer-implemented method, comprises: starting, on a source database (DB), a software update manager (SUM); creating, on the source DB and by the SUM, DB triggers and log tables; initiating creation of a clone DB, wherein the clone DB is a clone of the source DB; testing, using connection data to the clone DB, a connection to the clone DB; transferring, using the SUM and the connection data to the clone DB, initial data from the clone DB to a target DB; and initiating, using the SUM, a delta replay of recorded changes made to the source DB since creation of the clone DB.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, in the described approach, a database (DB) clone is transactionally consistent with the source DB and can utilize the full power of database technology available on a respective database platform. Second, database triggers can be much simpler, as they only have to record a primary key of changed data and not complete snapshot rows. This reduces complexity and reduces a performance impact of the database triggers on a production system. Third, procedures (e.g., SAP R3LOAD) used to export a DB into files and them import the files into a target DB system will not negatively impact the production system (e.g., DB load, memory utilization, and central processing unit (CPU) utilization), as the procedures for an initial transfer will read data from an isolated DB clone and not a working DB associated with the production system. Fourth, a need to continuously adjust a number of DB transfer processes (e.g., SAP R3 LOAD) depending on usage of a production system can be reduced or eliminated.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 2 is a flowchart illustrating an example of a computer-implemented method for preparation of a transactionally consistent database clone during a downtime optimized database conversion, according to an implementation of the present disclosure.

Like reference numbers and designations in the various drawings indicate like elements.

DETAILED DESCRIPTION

Figure 1:
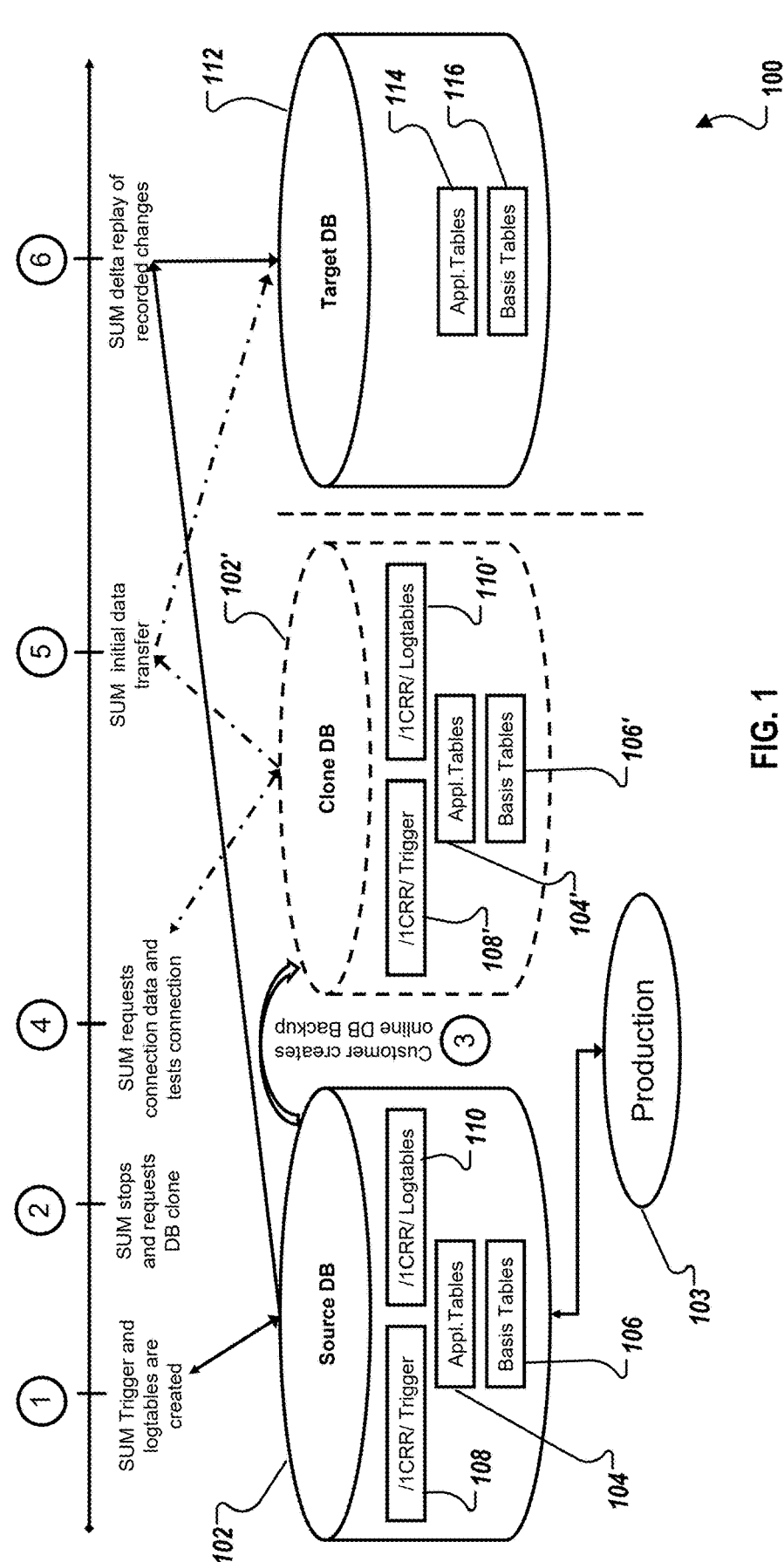
FIG. 1 is a block diagram of an example database system and process for preparation of a transactionally consistent database clone during a downtime optimized database conversion, according to an implementation of the present disclosure.

The following detailed description describes preparation of a transactionally consistent database clone during a downtime optimized database conversion and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A traditional software update manager (SUM) (e.g., SAP SOFTWARE UPDATE MANAGER) offers a procedure (e.g., SAP R3LOAD) for a downtime optimized database (DB) conversion (e.g., to an SAP S/4HANA in-memory DB). The procedure enables a time-consuming migration of the source DB data to be primarily migrated in uptime to reduce downtime of a database to convert and associated software applications.

Transactional consistency is a crucial prerequisite to execute the uptime conversion; meaning that any given DB transaction must change affected data only in allowed ways. Any data written to a DB (e.g., header tables and items tables) must be valid (i.e., valid according to all defined constraints and rules). If a read request immediately receives a latest value of a record after a successful write, update, or delete or a record, transactional consistency can be said to be satisfied. Records in all DB tables must have the same transactional consistency.

However, due to the need to copy a large amount of data in a table-wise manner, it is difficult to ensure that a header table is copied at the same point-in-time as a dependent item table. For example, it cannot easily be ensured that a header table is copied at the same point in time with the same set of data as the dependent item table.

A current solution uses complex DB trigger technology to ensure transactional consistency, but the DB trigger-based solution adds additional load on a production system and an initial data transfer of data from a source database can increase memory and CPU utilization. Additional load on the production system and increased memory and CPU utilization can force continuous adjustment of a number of processes to copy DB data.

The described approach leverages core functionality of a used DB platform, that is online backup and restore functionality. This means a user can prepare a database clone in parallel to production usage. The database clone is by definition transactionally consistent, as it uses core DB features (such as, redo-logs) and other features to ensure transactional consistency. Instead of restoring transactional consistency backwards using resource expensive DB trigger technology, the described approach permits the DB to set-up a transactionally consistent clone of the DB.

FIG. 1 is a block diagram 100 of an example database system and process for preparation of a transactionally consistent database clone during a downtime optimized database conversion, according to an implementation of the present disclosure.

At (1), a SUM is started on a source DB 102 (with application tables 104 and basis tables 106) that is associated with a production environment 103. The SUM prepares DB triggers 108 to record changes to the source DB 102 and log tables 110 to record DB changes. From (1), the process proceeds to (2).

At (2), as soon as the DB triggers 108 are in place, the SUM stops and a graphical user interface (GUI) dialog can be generated for user input. For example, a user can be asked to create an online DB backup (a clone DB 102') and to ramp up the online backup, meaning starting the cloned DB 102' so that it can be accessed. From (2), the process proceeds to (3).

At (3), the user initiates creation of the online backup (e.g., using the GUI dialog). In response, the clone DB 102' is created as a clone of the source DB 102 (along with analogous cloned application tables 104', basis tables 106', database triggers 108', and log tables 110'). The clone DB 102' is per definition transactionally consistent. As the clone DB 102' is isolated, no changes will occur to the data on the clone DB 102'. From (3), the process proceeds to (4).

At (4), the SUM requests connection data to the clone DB 102' from the user (e.g., using the GUI dialog). The user enters connection data to the clone DB 102' (e.g., using the GUI dialog). The SUM uses the connection data to the clone DB 102' to test the connection to the clone DB 102'. From (4), the process proceeds to (5).

At (5), the SUM uses the established connection to the clone DB 102' for an initial data-transfer from the clone DB 102' to a target DB 112. As the clone DB 102' is isolated, the initial data transfer to the target DB 112 will minimize any impact to the use of the source DB 102a and production resources associated with the source DB 102. From (5), the process proceeds to (6).

At (6), once the initial data transfer from the clone DB 102' to the target DB 112 (and associated application tables 114 and basis tables 116, which are, respectively, copies of application tables 104' and 106') is complete, the SUM initiates a delta replay of recorded changes made to the source DB 102 since the creation of the clone DB 102' at (3). This is possible because the DB triggers 108 on the source DB 102 have been recording changes made to the source DB 102 in the production environment 103.

Once the delta replay of recorded changes are made to the target DB 112, the target DB 112 can be used as a replacement for the source DB 102. Alternatively, the currently updated target DB 112 could periodically or in real-time be updated with changes made to the source DB 102 to keep a copy of the source DB 102 available (e.g., for disaster recovery).

FIG. 2 is a flowchart illustrating an example of a computer-implemented method 200 for preparation of a transactionally consistent database clone during a downtime optimized database conversion, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, A software update manager (SUM) is started on a source database (DB). From 202, method 200 proceeds to 204.

At 204, DB triggers and log tables are created on the source DB and by the SUM. The DB triggers record changes to the source DB and the log tables records DB changes. After the DB triggers are created, the SUM is stopped and a graphical user interface (GUI) is generated to create the clone DB and to ramp up the clone DB. From 204, method 200 proceeds to 206.

At 206, creation of a clone DB is initiated, where the clone DB is a clone of the source DB. In some implementations, initiating creation of a clone DB is performed using the GUI. The clone DB is transactionally consistent and isolated. From 206, method 200 proceeds to 208.

At 208, using connection data to the clone DB, a connection to the clone DB is tested. Using the SUM, connection data to the clone DB is requested. I some implementations, the requesting is performed using a graphical user interface (GUI). From 208, method 200 proceeds to 210.

At 210, using the SUM and the connection data to the clone DB, initial data is transferred from the clone DB to a target DB. From 210, method 200 proceeds to 212.

At 212, using the SUM, a delta replay of recorded changes made to the source DB since creation of the clone DB is initiated. Following completion of the delta replay, the target DB can be used as a replacement for the source DB. After 212, method 200 can stop.

Figure 3:
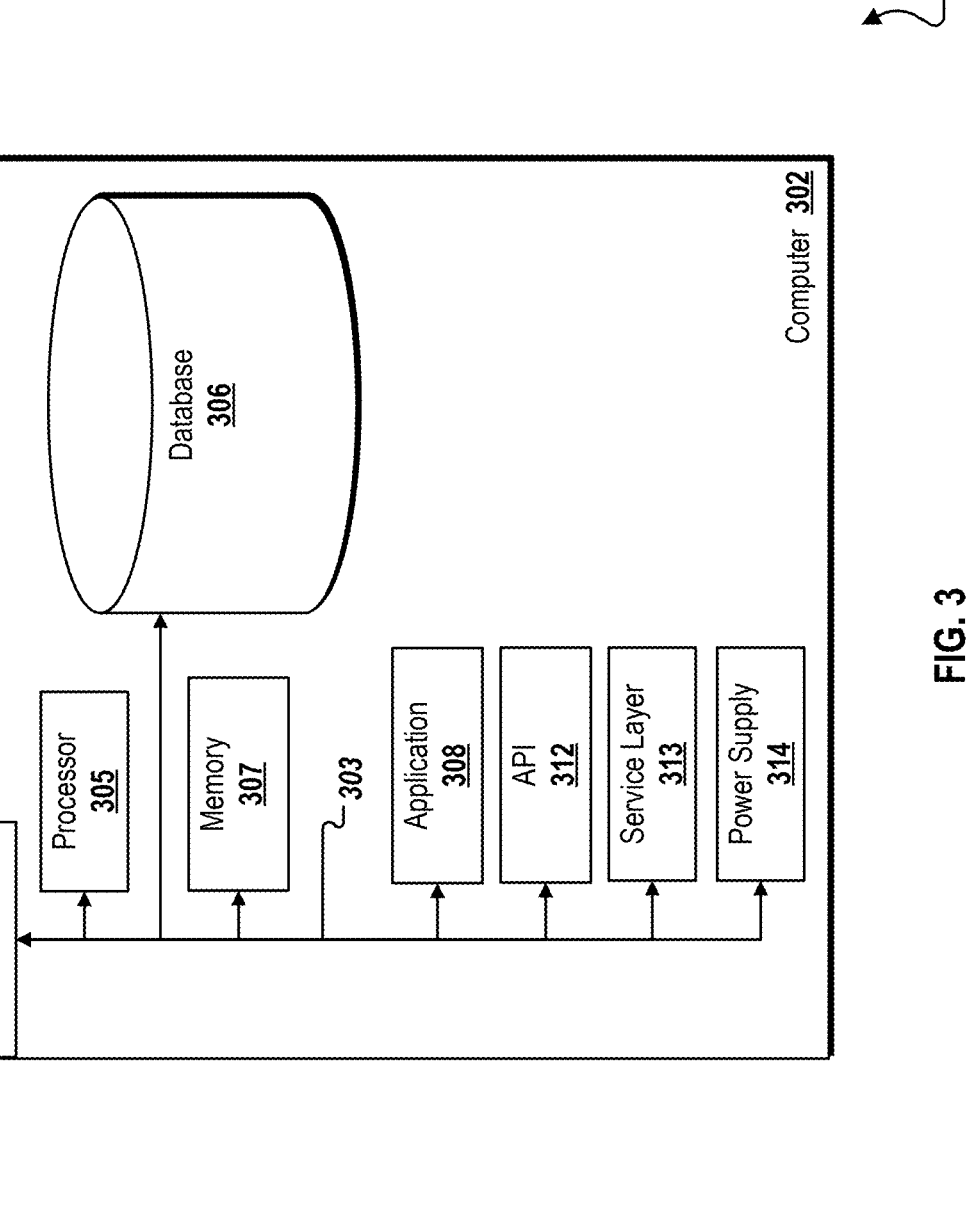
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, computer-implemented system 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. The Database 306 can hold and operate on at least any data type mentioned or any data type consistent with this disclosure.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: starting, on a source database (DB), a software update manager (SUM); creating, on the source DB and by the SUM, DB triggers and log tables; initiating creation of a clone DB, wherein the clone DB is a clone of the source DB; testing, using connection data to the clone DB, a connection to the clone DB; transferring, using the SUM and the connection data to the clone DB, initial data from the clone DB to a target DB; and initiating, using the SUM, a delta replay of recorded changes made to the source DB since creation of the clone DB.

The foregoing and other described implementations can each, optionally, include one or more of the following features:

A first feature, combinable with any of the following features, wherein the DB triggers record changes to the source DB and the log tables records DB changes.

A second feature, combinable with any of the previous or following features, wherein, after the DB triggers are created: stopping the SUM; and generating a graphical user interface (GUI) to create the clone DB and to ramp up the clone DB.

A third feature, combinable with any of the previous or following features, wherein initiating creation of a clone DB is performed using the GUI.

A fourth feature, combinable with any of the previous or following features, wherein the clone DB is transactionally consistent and isolated.

A fifth feature, combinable with any of the previous or following features, comprising: requesting, using the SUM, connection data to the clone DB, wherein the requesting is performed using a graphical user interface (GUI).

A sixth feature, combinable with any of the previous or following features, comprising: following completion of the delta replay, using the target DB as a replacement for the source DB.

In a second implementation, a non-transitory, computer-readable medium storing one or more instructions executable by a computer system to perform one or more operations, comprising: starting, on a source database (DB), a software update manager (SUM); creating, on the source DB and by the SUM, DB triggers and log tables; initiating creation of a clone DB, wherein the clone DB is a clone of the source DB; testing, using connection data to the clone DB, a connection to the clone DB; transferring, using the SUM and the connection data to the clone DB, initial data from the clone DB to a target DB; and initiating, using the SUM, a delta replay of recorded changes made to the source DB since creation of the clone DB.

The foregoing and other described implementations can each, optionally, include one or more of the following features:

A first feature, combinable with any of the following features, wherein the DB triggers record changes to the source DB and the log tables records DB changes.

A second feature, combinable with any of the previous or following features, wherein, after the DB triggers are created: stopping the SUM; and generating a graphical user interface (GUI) to create the clone DB and to ramp up the clone DB.

A third feature, combinable with any of the previous or following features, wherein
initiating creation of a clone DB is performed using the GUI.

A fourth feature, combinable with any of the previous or following features, wherein the clone DB is transactionally consistent and isolated.

A fifth feature, combinable with any of the previous or following features, comprising: requesting, using the SUM, connection data to the clone DB, wherein the requesting is performed using a graphical user interface (GUI).

A sixth feature, combinable with any of the previous or following features, comprising: following completion of the delta replay, using the target DB as a replacement for the source DB.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: starting, on a source database (DB), a software update manager (SUM); creating, on the source DB and by the SUM, DB triggers and log tables; initiating creation of a clone DB, wherein the clone DB is a clone of the source DB; testing, using connection data to the clone DB, a connection to the clone DB; transferring, using the SUM and the connection data to the clone DB, initial data from the clone DB to a target DB; and initiating, using the SUM, a delta replay of recorded changes made to the source DB since creation of the clone DB.

The foregoing and other described implementations can each, optionally, include one or more of the following features:

A first feature, combinable with any of the following features, wherein the DB triggers record changes to the source DB and the log tables records DB changes.

A second feature, combinable with any of the previous or following features, wherein, after the DB triggers are created: stopping the SUM; and generating a graphical user interface (GUI) to create the clone DB and to ramp up the clone DB.

A third feature, combinable with any of the previous or following features, wherein initiating creation of a clone DB is performed using the GUI.

A fourth feature, combinable with any of the previous or following features, wherein the clone DB is transactionally consistent and isolated.

A fifth feature, combinable with any of the previous or following features, comprising: requesting, using the SUM, connection data to the clone DB, wherein the requesting is performed using a graphical user interface (GUI).

A sixth feature, combinable with any of the previous or following features, comprising: following completion of the delta replay, using the target DB as a replacement for the source DB.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near (ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implement method, comprising:
    starting, on a source database (DB), a software update manager (SUM);
    creating, on the source DB and by the SUM, DB triggers and log tables;
    initiating creation of a clone DB, wherein the clone DB is a clone of the source DB;
    testing, using connection data to the clone DB, a connection to the clone DB;
    transferring, using the SUM and the connection data to the clone DB, initial data from the clone DB to a target DB; and
    initiating, using the SUM, a delta replay to the target DB of recorded changes made to the source DB since creation of the clone DB.

2. The computer-implemented method of claim 1, wherein the DB triggers record changes to the source DB and the log tables records DB changes.

3. The computer-implemented method of claim 1, wherein, after the DB triggers are created:
    stopping the SUM; and
    generating a graphical user interface (GUI) to create the clone DB and to ramp up the clone DB.

4. The computer-implemented method of claim 3, wherein initiating creation of a clone DB is performed using the GUI.

5. The computer-implemented method of claim 1, wherein the clone DB is transactionally consistent and isolated.

6. The computer-implemented method of claim 1, comprising:

requesting, using the SUM, connection data to the clone DB, wherein the requesting is performed using a graphical user interface (GUI).

7. The computer-implemented method of claim 1, comprising:
    following completion of the delta replay, using the target DB as a replacement for the source DB.

8. A non-transitory, computer-readable medium storing one or more instructions executable by a computer system to perform one or more operations, comprising:
    starting, on a source database (DB), a software update manager (SUM);
    creating, on the source DB and by the SUM, DB triggers and log tables;
    initiating creation of a clone DB, wherein the clone DB is a clone of the source DB;
    testing, using connection data to the clone DB, a connection to the clone DB;
    transferring, using the SUM and the connection data to the clone DB, initial data from the clone DB to a target DB; and
    initiating, using the SUM, a delta replay of recorded changes made to the source DB since creation of the clone DB.

9. The non-transitory, computer-readable medium of claim 8, wherein the DB triggers record changes to the source DB and the log tables records DB changes.

10. The non-transitory, computer-readable medium of claim 8, wherein, after the DB triggers are created:
    stopping the SUM; and
    generating a graphical user interface (GUI) to create the clone DB and to ramp up the clone DB.

11. The non-transitory, computer-readable medium of claim 10, wherein initiating creation of a clone DB is performed using the GUI.

12. The non-transitory, computer-readable medium of claim 8, wherein the clone DB is transactionally consistent and isolated.

13. The non-transitory, computer-readable medium of claim 8, comprising:
    requesting, using the SUM, connection data to the clone DB, wherein the requesting is performed using a graphical user interface (GUI).

14. The non-transitory, computer-readable medium of claim 8, comprising:
    following completion of the delta replay, using the target DB as a replacement for the source DB.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations, comprising:
        starting, on a source database (DB), a software update manager (SUM);
        creating, on the source DB and by the SUM, DB triggers and log tables;
        initiating creation of a clone DB, wherein the clone DB is a clone of the source DB;
        testing, using connection data to the clone DB, a connection to the clone DB;
        transferring, using the SUM and the connection data to the clone DB, initial data from the clone DB to a target DB; and initiating, using the SUM, a delta replay of recorded changes made to the source DB since creation of the clone DB.

16. The computer-implemented system of claim 15, wherein the DB triggers record changes to the source DB and the log tables records DB changes.

17. The computer-implemented system of claim 15, wherein, after the DB triggers are created:

stopping the SUM; and generating a graphical user interface (GUI) to create the clone DB and to ramp up the clone DB.

18. The computer-implemented system of claim 17, wherein initiating creation of a clone DB is performed using the GUI.

19. The computer-implemented system of claim 15, wherein the clone DB is transactionally consistent and isolated.

20. The computer-implemented system of claim 15, comprising:

requesting, using the SUM, connection data to the clone DB, wherein the requesting is performed using a graphical user interface (GUI).

* * * * *